Aug. 3, 1948.  F. M. McCLENAHAN  2,446,484
METHOD OF CONVERTING NORMAL AMMONIUM
FLUORIDE TO AMMONIUM BIFLUORIDE
Filed Dec. 30, 1943
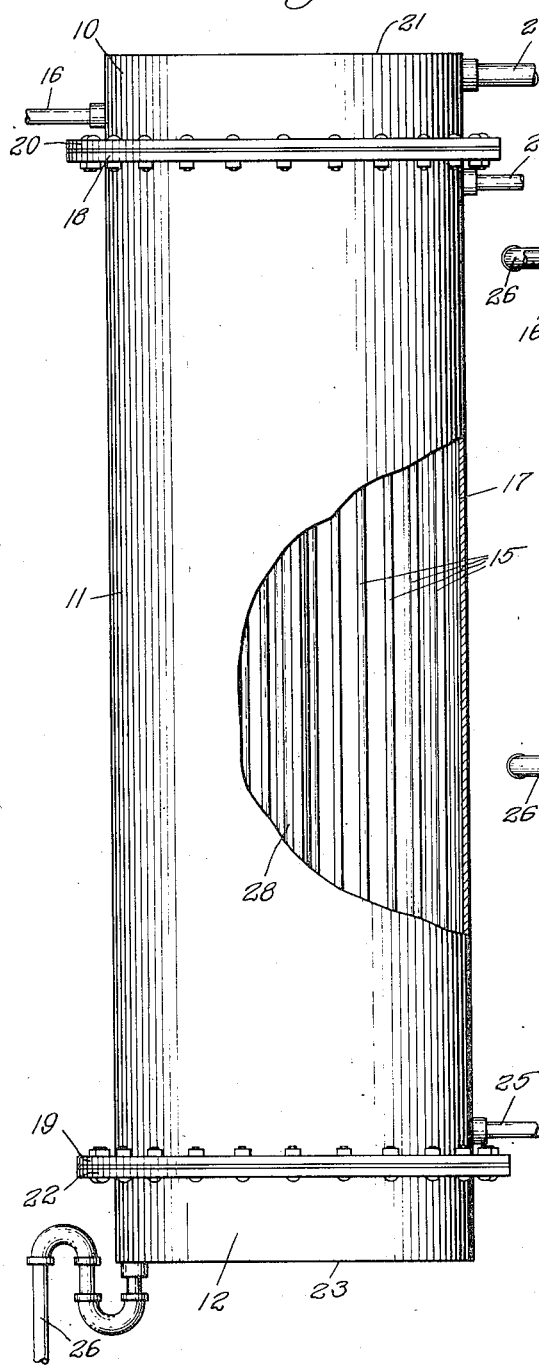
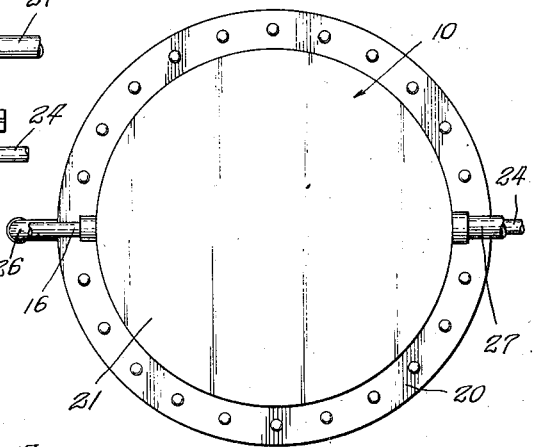
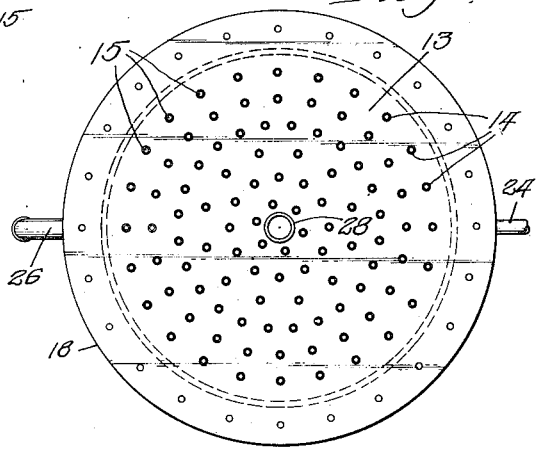
Inventor:
Francis M. McClenahan,
By Christon, Wiles, Davies,
Schroeder & Merriam, Attys.

UNITED STATES PATENT OFFICE 2,446,484

METHOD OF CONVERTING NORMAL AMMONIUM FLUORIDE TO AMMONIUM BIFLUORIDE

Francis M. McClenahan, Monmouth, Ill.

Application December 30, 1943, Serial No. 516,152

5 Claims. (Cl. 23—88)

This invention relates to apparatus for and method of converting normal ammonium fluoride to ammonium bifluoride.

In my Patents Nos. 1,918,923, issued July 18, 1933, and 1,903,187, issued March 28, 1933, are disclosed processes of manufacturing alumina from aluminum silicate materials such as clay. The present invention is particularly applicable to such a process but it is also useful in any other process where it is desirable to convert normal ammonium fluoride to the bifluoride.

In the course of the process described in the foregoing patents, normal ammonium fluoride is produced in aqueous solution in large volume and it is essential to the economy of the process that the fluoride be recovered with a high degree of efficiency and economy.

The present invention provides a continuous means of converting the normal ammonium fluoride to the bifluoride without loss of either the fluoride or the ammonia.

In order to accomplish this, the aqueous solution of normal ammonium fluoride is heated to remove water vapor and ammonia. I have found that decomposition of the material takes place along with the removal of water in accordance with the following equation:

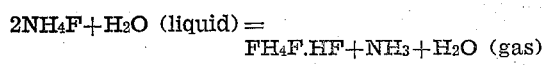

$$2NH_4F + H_2O \text{ (liquid)} = FH_4F \cdot HF + NH_3 + H_2O \text{ (gas)}$$

I have found that decomposition of the normal fluoride into the bifluoride is by no means complete when all of the water has been evaporated, but that it is necessary to continue the treatment after the removal of water, with a temperature above 100° C., upon the mixture of normal fluoride and bifluoride which is maintained in molten condition. In the present method, this is accomplished by continuous removal of water vapor and ammonia until the water has all been evaporated, after which the temperature is raised gradually until it reaches 115 to 116° C. at which temperature fuming may occur. The temperature is, however, further raised to approximately 125° C. At the latter temperature, transformation is complete.

The process is carried on in a continuous manner with the aqueous solution of normal ammonium fluoride passing through restricted enclosed conduits countercurrent to a flow of both ammonia and steam, the temperature of the material being gradually increased during the flow, so that at the outlet substantially pure ammonium bifluoride is recovered.

The invention is illustrated in the drawings, in which—

Figure 1 is a side elevation of the apparatus, partly in section; Figure 2 is a plan view; Figure 3 is a similar view with the cap of the apparatus removed; and Figure 4 is a partial sectional elevation.

The conversion apparatus comprises three main sections, namely, the upper sump 10, the conversion section 11, and the lower sump 12. The upper sump is best illustrated in Figures 3 and 4. It comprises a plate 13 having a number of openings 14 each containing a small pipe 15. Each of these pipes protrudes somewhat above the plate 13, as shown in Figure 4, to provide for the maintenance of a pool of liquid upon the plate. In preferred practice the pipes are each ¼ inch in internal diameter and extend ¼ inch above the plate 13.

The normal ammonium fluoride solution enters the system through the pipe 16 and first forms a pool upon the plate, after which surplus material flows down the pipes and into the conversion section of the apparatus. The conversion section comprises a sealed housing 17 surrounding the pipes 15. This housing is provided with an upper flange 18 and a lower flange 19 which are detachably secured, respectively, to the flange 20 of the sump cover 21 and the flange 22 of the lower sump housing 23. Steam under suitable high pressure is introduced to the conversion section through the pipe 24 and is removed through the pipe 25.

The lower sump comprises the sump housing 23 and a draw off line 26 suitably trapped.

The upper sump is likewise provided with an outlet port 27 for the escape of ammonia and water vapor. The ammonia may, of course, be recovered in any suitable recovery system.

The lower sump should either be well insulated to maintain suitable melting temperature therein or may be heated in any suitable fashion.

A relatively large opening is likewise provided between the lower and upper sumps in the form of the pipe 28 which extends from the lower sump to the upper sump and prevents any undue accumulation of pressure difference between them.

The operation of the device is as follows: The normal ammonium fluoride in water solution is supplied to the plate 13 and is preheated thereon. The area and depth of solution on the plate may be varied in accordance with the temperature of incoming material and is in any case sufficient so that material entering the tubes 15 is substantially at or close to 100° C. The preheated solution of normal ammonium fluoride trickles down the tubes 15 and is further heated therein by the circulating steam about the tubes. The steam employed is preferably at a temperature of somewhat more than 125° C., generally about 130° C. and it is preferred that the flow of steam be concurrent with, although separate from, the flow of material in the tubes. The temperature is correlated to the size and length of the tubes so that by the time the material has reached the bottom of the tubes, it has been freed from water and transformed largely to the bifluoride and is also high enough to melt the resulting bifluoride and permit it to flow as a liquid from the tubes into the lower sump. The lower sump provides a pool of suitable depth within which the molten bifluoride is maintained for a period sufficient to complete the transformation of any normal ammonium fluoride remaining.

During the travel of the aqueous normal ammonium fluoride down the tubes, water and ammonia are generated. In the beginning, the amount of water vapor generated is considerably more than in the later stages, whereas the generation of ammonia tends to increase as movement progresses and the material becomes more dehydrated.

I have found that it is advantageous to return the water and ammonia vapors over the surfaces of the incoming liquid, even though it might have been expected that they would be reabsorbed therein.

I have found that steel is a suitable material for the manufacture of the conversion structure. The fluorides have a minimum corrosive effect upon steel and equipment made of this material has a satisfactory effective life. Wrought iron may be substituted in some cases.

I have found that suitable conversion is effective if the tubes are ¼ inch internal diameter and 3 feet long. A depth of molten material in the lower sump of 1 to 1½ inches for such an apparatus has proved effective.

The foregoing detailed description has been given for clearness of understanding only, and no unnecessary limitations should be understood therefrom.

I claim:

1. The method of transforming normal ammonium fluoride solution to ammonium bifluoride which comprises preheating a pool of aqueous solution of normal ammonium fluoride, supplying additional aqueous ammonium fluoride to the pool to cause it to overflow, passing the heated overflowing material by gravity through a restricted enclosed elongated heating zone, supplying heat to the material in such zone to generate water vapor and ammonia, whereupon the generated vapors pass countercurrent to the material flowing through the zone, collecting material from the heating zone into a liquid pool substantially of ammonium bifluoride, retaining the material therein until it is substantially free from normal ammonium fluoride, and maintaining an atmosphere of ammonia above the liquid pool of ammonium bifluoride to inhibit appreciable sublimation of said bifluoride.

2. The method as set forth in claim 1, in which the heating is carried out by steam passed separately from but concurrent with the flow of material in the heating zone.

3. The method as set forth in claim 1, in which the material in the heating zone has an outlet temperature of approximately 125° C. at atmospheric pressure.

4. The method as set forth in claim 1, in which the material in the heating zone has an outlet temperature of approximately 125° C. and an inlet temperature of approximately 100° C., both temperatures being at atmospheric pressure.

5. The method of converting normal ammonium fluoride to ammonium bifluoride which comprises heating an aqueous solution of normal ammonium fluoride at a temperature of about 100° C. to drive off water, increasing the temperature to about 115 to 116° C. to drive off ammonia and any remaining water, gradually increasing the temperature to approximately 125° C. until substantially all the normal ammonium fluoride has been converted to the bifluoride with the bifluoride being maintained in molten condition, and maintaining an atmosphere of ammonia above the molten ammonium bifluoride to inhibit appreciable sublimation of the bifluoride, all said temperatures being at approximately atmospheric pressure.

FRANCIS M. McCLENAHAN.

REFERENCES CITED

The following references are of record in the file of this patent:

UNITED STATES PATENTS

| Number | Name | Date |
|---|---|---|
| 1,235,552 | Chappell | Aug. 7, 1917 |
| 1,402,336 | Backhaus | Jan. 3, 1922 |
| 1,438,123 | McElroy | Dec. 5, 1922 |
| 1,642,788 | Proctor | Sept. 20, 1927 |
| 2,003,745 | Forsberg | June 4, 1935 |
| 2,156,273 | Bozarth | May 2, 1939 |
| 2,189,173 | Hebbard et al. | Feb. 6, 1940 |
| 2,234,057 | Mount | Mar. 4, 1941 |

FOREIGN PATENTS

| Number | Country | Date |
|---|---|---|
| 265,669 | Great Britain | Feb. 14, 1927 |
| 392,631 | Great Britain | May 25, 1933 |
| 457,155 | Great Britain | Nov. 23, 1936 |

OTHER REFERENCES

Mellor, Comprehensive Treatise on Inorganic and Theoretical Chemistry, vol. 2 (1922), pp. 520–21.